United States Patent [19]

Keogh

[11] 4,255,303

[45] Mar. 10, 1981

[54] POLYETHYLENE COMPOSITION CONTAINING TALC FILLER FOR ELECTRICAL APPLICATIONS

[75] Inventor: Michael J. Keogh, Bridgewater, N.J.

[73] Assignee: Union Carbide Corporation, New York, N.Y.

[21] Appl. No.: 33,328

[22] Filed: Apr. 25, 1979

Related U.S. Application Data

[63] Continuation-in-part of Ser. No. 899,563, Apr. 27, 1978, abandoned, which is a continuation-in-part of Ser. No. 800,899, May 26, 1977, abandoned.

[51] Int. Cl.$^3$ .................. C08K 9/04; C08L 23/06
[52] U.S. Cl. .................. 260/23 H; 260/42.14; 260/42.45; 260/42.46; 428/379; 428/461
[58] Field of Search ............ 260/23 H, 42.45, 42.46, 260/42.14; 428/379, 461

[56] References Cited

U.S. PATENT DOCUMENTS

| | | | |
|---|---|---|---|
| 2,448,799 | 9/1948 | Happoldt et al. | 260/28.5 A |
| 3,157,614 | 11/1964 | Fischer | 260/42.56 |
| 3,470,122 | 9/1969 | Ridgeway et al. | 260/23 H |
| 3,835,091 | 9/1974 | Roos et al. | 260/42.45 |
| 3,882,061 | 5/1975 | Bontinck et al. | 260/42.46 |
| 3,960,739 | 6/1976 | Mackenzie | 252/63.2 |
| 4,035,322 | 7/1977 | Tate et al. | 260/42.46 |
| 4,069,190 | 1/1978 | Vostovich | 260/42.45 |
| 4,075,146 | 2/1978 | Kiss | 260/23 H |

FOREIGN PATENT DOCUMENTS

700613 12/1964 Canada .................. 260/42.14

OTHER PUBLICATIONS

Smith et al., EPR for Wire and Cable Insulation, Article in Rubber World, Mar. 1964, pp. 54–65.

*Primary Examiner*—Ronald W. Griffin
*Attorney, Agent, or Firm*—James C. Arvantes

[57] ABSTRACT

A composition for electrical applications having good electrical resistance, tensile strength and elongation consisting essentially of:
(a) ethylene polymer, and
(b) at least 10 parts by weight of talc filler per 100 parts by weight of ethylene polymer, said talc filler coated with at least one metallic salt of a fatty acid having 8 to 20 carbon atoms.

48 Claims, No Drawings

POLYETHYLENE COMPOSITION CONTAINING TALC FILLER FOR ELECTRICAL APPLICATIONS

This is a continuation-in-part of application Ser. No. 899,563, filed Apr. 27, 1978, abandoned, which is a continuation-in-part of application Ser. No. 800,899, filed May 26, 1977, abandoned.

BACKGROUND OF THE INVENTION

1. Field of the Invention

This invention relates to a composition for electrical applications based on an ethylene polymer containing a talc filler coated with a metallic salt of a fatty acid having 8-20 carbon atoms.

2. Description of the Prior Art

Compositions which are employed on electrical wire and cable are, in many cases, prepared from compositions which are based on vulcanizable, or crosslinkable, ethylene polymers. These ethylene polymer based compositions may be filled with various fillers, as well as coated fillers, as described, for example, in U.S. Pat. Nos. 3,148,169, 3,832,326 and 3,922,422.

The fillers, when added to ethylene based polymer compositions, reduce the cost of the composition as well as increase the mechanical properties of the compositions, in that they toughen the materials as for example, increasing the abrasion resistance. Additionally, the fillers decrease the flammability of the ethylene polymer by their addition thereto.

However, there are certain adverse effects in the use of filled ethylene polymer based compositions. The problems encountered in the use of fillers include the fact that the insulation properties, for example, are more susceptible to moisture, i.e., the insulation on a finished wire or cable is more susceptible to moisture.

Additionally, the elongation is generally adversely affected by the use of a filler. Also, in order to process the ethylene based compositions so as to adapt them to be placed, as, for example, insulation, on the electrical conductor components of the wire and cable, it is usually necessary to admix the components of the compositions at high temperatures, and to extrude them, again at high temperatures, onto the electrical conductor. When certain fillers are used in combination with certain types of ethylene polymers or in certain types of ethylene polymer based compositions, the entire curable composition is susceptible to scorching during the high temperature processing thereof prior to the vulcanization of the composition on the electrical conductor. Scorching is, in effect, the premature vulcanization of the insulation composition. This premature vulcanization usually occurs, when it occurs, in the barrel or die head of the extruder in which the insulation composition is being processed, at elevated temperatures, prior to its being extruded onto an electrical conductor, and prior to its intended vulcanization. When an insulation composition is scorched in the extruder, the extruded composition will have imperfections in the form of discontinuity and roughness in the surface of the extrudate, and lumps or surface ripples caused by gel particles in the body of the extrudate. In addition, excessive scorching may cause enough of a pressure build-up in the extrusion device to require a cessation of the extrusion operation entirely.

Talc itself is a poor filler, since the tensile and elongation properties of a talc filled ethylene polymer based composition are unacceptable. These unacceptable properties of tensile strength and elongation indicate incompatibility between the talc and ethylene polymer.

SUMMARY OF THE INVENTION

It has now been found that when an ethylene polymer based composition which employs talc filler is coated with at least one metallic salt of a fatty acid having 8-20 carbon atoms, the ethylene polymer and talc filler are rendered compatible.

An object of the present invention is to provide a filled ethylene polymer based composition for electrical applications which has superior tensile strength, elongation and insulation resistance to moisture.

Another object of this invention is to provide scorch resistant, curable compositions based on filled ethylene polymer based compositions having such properties.

A further object of the present invention is to provide scorch resistant insulation for electrical wire and cable.

A further object of the present invention is to provide a flame resistant composition for electrical insulation based on a filled ethylene polymer composition.

A further object of the present invention is to provide a wire and cable conductive shield composition based on a filled ethylene polymer containing conductive carbon black.

These and other objects of the present invention are achieved by employing a talc filler coated with at least one metallic salt of a fatty acid having 8-20 carbon atoms in ethylene polymer based compositions.

DESCRIPTION OF THE PREFERRED EMBODIMENTS

One aspect of the present invention comprises a composition for electrical applications having good electrical resistance, tensile strength and elongation consisting essentially of:

(a) an ethylene polymer; and (b) at least 10, preferably 10 to 150, more preferably 10 to about 25 and most preferably 25 to 45 parts by weight per 100 parts by weight of ethylene polymer, of talc coated with from about 0.05 to about 5.0 and preferably from about 0.05 to about 2.0 parts by weight per hundred parts by weight of talc, of at least one metallic salt of a fatty acid of 8-20 carbon atoms.

The composition may contain a flame retardant additive in an amount sufficient to render the composition flame retardant.

A second aspect of the invention comprises a composition suitable for use as a semi-conductor having good tensile strength and elongation consisting essentially of:

(a) ethylene polymer, (b) at least 10 parts by weight talc filler per 100 parts by weight of ethylene polymer, said talc filler coated with at least one metallic salt of a fatty acid having 8 to 20 carbon atoms, (c) conductive carbon black having a high specific surface area.

A third aspect of the invention comprises a masterbatch suitable for use with compatible ethylene polymers to form compositions having good electrical properties, tensile strength and elongation, said masterbatch consisting essentially of:

(a) ethylene polymer, (b) from 100 to 1000 parts by weight of talc filler per 100 parts by weight of ethylene polymer, said talc filler coated with at least one metallic salt of a fatty acid having 8 to 20 carbon atoms.

Preferably the masterbatch will contain 250 to 500 parts by weight of talc filler per 100 parts by weight of ethylene polymer.

ETHYLENE POLYMER

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, >C=C<. These other interpolymerizable compounds may be hydrocarbon compounds such as, butene-1, pentene-1, isoprene, butadiene, bicycloheptene, bicycloheptadiene, and styrene, as well as vinyl compounds such as vinyl acetate and ethyl acrylate.

These copolymers could thus include those containing >0 to 70 weight percent of propylene and 30 to <100 weight percent of ethylene; and >0 to <50 weight percent butene-1 or vinyl acetate or alkyl acrylate (preferably ethyl acrylate) and 50 to <100 weight percent of ethylene; >0 to <30 weight percent of propylene, >0 to 20 weight percent of butene-1 and 50 to <100 weight percent of ethylene.

The ethylene polymers may be used individually, or in combinations thereof. The ethylene polymers have a density (ASTM 1505 test procedure with conditioning as in ASTM D-1248-72) of about 0.86 to 0.96 and a melt index (ASTM D-1238 at 44 psi test pressure) of about 0.1 to 20 decigrams per minute.

CURING AGENT

The ethylene polymers may be curable. They are cured by irradiation with high-energy electron beams or through the use of a chemical curing agent.

The art of electron beam crosslinking is so highly developed that one skilled in the art is very familiar with this procedure.

The chemical curing agent is preferably an organic peroxide. The organic peroxide curing agent which can be used in the present invention includes all organic peroxides which are capable of providing free radicals for crosslinking the ethylene polymer under the crosslinking conditions employed for the compositions.

The organic peroxide compounds can be used individually or in combination with one another.

The preferred organic peroxide compounds which may be used in the compositions of the present invention may also be generally classified as those in which each oxygen atom of each peroxide group is directly bonded to a tertiary carbon atom whose remaining valances are attached to hydrocarbon radicals selected from the group consisting of alkyl, cycloalkyl, aryl and aralkyl. Peroxides of this type are generally disclosed in U.S. Pat. No. 2,888,424. Examples of the organic peroxide compounds which may be used in the compositions of the present invention would include:

di-$\alpha$-cumyl peroxide
2,5-dimethyl-2,5-di(t-butyl peroxy)-hexyne-3
2,5-dimethyl-2,5-di(t-butyl peroxy)-hexane
t-butyl cumyl peroxide
di-t-butyl peroxide
$\alpha,\alpha'$-bis(t-butyl peroxy)-p-di-isopropyl benzene
2,5-dimethyl-2,5-di(benzoyl peroxy)-hexane
t-butyl peroxy isopropyl carbonate.

Additionally, organic hydroperoxide compounds as disclosed in U.S. Pat. Nos. 3,954,907 and 4,018,852 are suitable for use in the present invention.

The organic peroxide compounds are used in crosslinking effective amounts in the compositions of the present invention which may range from about 0.1 to 8.0, and preferably about 0.3 to 5.0, parts of organic peroxide compound per 100 parts by weight of ethylene polymer in such compositions.

TALC FILLER

The talc filler of the instant invention is commercially available in different forms and grades. The filler has a median particle size of from 0.10 to about 10.0 microns, preferably from 0.80 to about 3.0 microns.

METAL SALT

The metallic salts of the fatty acids that can be employed herein are selected from the Mendeleev Periodic Table of the Elements, Group Ia, IIa, or IIb metal salts, of saturated or unsaturated monobasic or dibasic, branched or straight chain fatty acids of 8–20 carbon atoms. Such acids that may be included within the practice of this invention, but are not limited thereto, are palmitic, stearic, lauric, oleic, sebacic, ricinoleic, and palmitoleic.

The preferred acid is stearic acid. The preferred metal salts are calcium stearate and zinc stearate.

FLAME RETARDANT

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g. antimony oxide; elemental phosphorus or a phosphorus compound; a halogen-containing compound in admixture with a phosphorus compound or compounds containing phosphorus-nitrogen bonds or a mixture of two or more of the foregoing. In general, however, the amount of additive will be from 0.5 to about 100 parts per hundred parts of ethylene polymer. A preferred range will be from about 10 to about 75 parts and an especially preferred range will be from about 35 to about 55 parts of additive per 100 parts of ethylene polymer. Smaller amounts of compounds highly concentrated in the elements responsible for flame-retardance will be sufficient, e.g., elemental red phosphorus will be preferred at 0.5 to about 10 parts per hundred parts of ethylene polymer while phosphorus in the form of triphenyl phosphate will be used at 5 to 25 parts of phosphate per hundred parts of ethylene polymer and so forth. Halogenated aromatics will be used at 5 to about 45 parts and synergists, e.g., inorganic or organic antimony compounds such as antimony oxide, will be used at about 2 to about 20 parts per 100 parts of ethylene polymer.

ANTIOXIDANT

The compositions of the present invention also advantageously include about 0.01 to 3.0 and, preferably 0.05 to 1.0, parts of one or more suitable high temperature antioxidants for the ethylene polymer per 100 parts of the ethylene polymer.

These antioxidants are preferably sterically hindered phenols. Such compounds would include
1,3,5-trimethyl-2,4,6-tris(3,5-ditertiary butyl-4-hydroxy benzyl)benzene;
1,3,5-tris(3,5-ditertiary butyl-4-hydroxy benzyl)-5-triazine-2,4,6-(1H,3H,5H)trione;
tetrakis- [methylene-3-(3',5-di-t-butyl-4'-hydroxy phenyl)-propionate] methane; and
di(2-methyl-4-hydroxy-5-t-butyl phenyl)sulfide,
1,2-dihydro-2,2,4-trimethylquinoline.

Polymerized 2,2,4-trimethyl dihydroquinoline may also be used.

The antioxidants may be used individually, or in combination with one another.

CARBON BLACK

The compositions of the present invention also advantageously include carbon blacks, including furnace blacks, acetylene blacks, and channel blacks. If the composition is to be used as a semi-conductor or as a conductive wire shield, then conductive carbon black having a high specific surface area should be used. The conductive carbon should have a particle size of the order of about 10 to about 60 millimicrons and a $N_2$ surface area of about 10 to 1100 $m^2/g$. About 1 to about 25, and preferably from about 2 to about 16 parts of the carbon black is used per 100 parts of the ethylene polymer.

If the composition is to be an insulator, then non-conductive carbon black should be used.

ADJUVANTS

In addition to the ethylene polymer, talc, and metal salt, the compositions of the present invention may also contain other adjuvants of the types normally used in curable compositions for electric insulation.

These other adjuvants would include curing agents; flame retardant additives; antioxidants; carbon black; other fillers, blowing agents; nucleating agents for blown systems; lubricants; UV stabilizers; dyes and colorants; voltage stabilizers; metal deactivators; and coupling agents.

These adjuvants would be used in amounts designed to provide the intended effect in the resulting composition.

The compositions of the present invention may also be extended, or filled, with polymers other than the ethylene polymer which are compatible, i.e. can be physically blended or alloyed, with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride, polypropylene, and chlorinated polyethylene.

The total amount of adjuvants used will range from 0 to about 60 weight percent based on the total weight of the composition.

PROCESSING OF THE COMPOSITIONS

All of the components of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. The talc filler may be coated by mixing the talc, metallic salt of fatty acid, and ethylene polymer together in a mixer. Preferably, however, the talc filler is precoated with metallic salt of fatty acid by known techniques prior to mixing the talc with ethylene polymer. As regards blending, the components may be fluxed on a variety of apparatus including, for example, multi-roll mills, screw mills, continuous mixers, compounding extruders and Banbury mixers, or dissolved in mutual or compatible solvents.

When all the solid components of the composition are available in the form of a powder, or as small particles, the compositions are most conveniently prepared by first making a blend of the components, say in a Banbury mixer or a continuous extruder, and then masticating this blend on a heated mill, for instance a two-roll mill, and the milling continued until an intimate mixture of the components is obtained. Alternatively, a master batch containing the ethylene polymer and the talc filler or talc filler and carbon black and, if desired, some or all of the other components, may be added to the mass of polymer. Where the ethylene polymer is not available in powder form the compositions may be made by introducing the polymer to the mill, masticating it until it forms a band around roll, after which a blend of the remaining components is added and the milling continued until an intimate mixture is obtained. The rolls are preferably maintained at a temperature which is within the range 80° C. to 135° C. and which is below the decomposition temperatures of the first peroxide compound(s) if such are used. The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus.

The compositions are then extruded onto a wire or cable, or other substrate. If the compositions of the present invention, are curable, they are extruded onto the wire or cable, or other substrate and vulcanized at elevated temperatures of about >180° C. and preferably at >200–230° C. using conventional vulcanizing procedures.

The following examples are merely illustrative of the present invention and are not intended as a limitation on the scope thereof.

EXAMPLES 1–17

The compositions of these Examples were prepared by mixing in a suitable mixer all of the components together and then transferring these into a Banbury mixer. Where the filler was precoated, the filler and coating material were separately blended to intimately coat the surface of the filler. Then, the coated filler was mixed with the other components as indicated.

The formulations of the compositions are set forth in Table I.

A constant weight of material is added to a Brabender mixer maintained at 150° C. and 50 RPM and suitably

TABLE I

| | 1 | 2 | 3 | 4 | 5 | 6 | 7 | 8 | 9 | 10 |
|---|---|---|---|---|---|---|---|---|---|---|
| Ethylene-Vinyl Acetate Copolymer (a) | 70.9 | 70.9 | 70.9 | 70.9 | 70.9 | 70.9 | 70.9 | 70.9 | 70.9 | 70.9 |
| Ethylene-Ethyl Acrylate Copolymer (b) | — | — | — | — | — | — | — | — | — | — |
| Talc | 26.8 | 26.55[1] | 24.05[1] | 26.3 | 23.8 | 26.3 | — | — | — | — |
| Aluminum Silicate | — | — | — | — | — | — | 24.05[1] | 24.05[1] | — | — |
| Calcium Carbonate | — | — | — | — | — | — | — | — | 24.05[1] | 24.05[1] |
| Amorphous Silica | — | — | — | — | — | — | — | — | — | — |
| Aluminum Trihydrate | — | — | — | — | — | — | — | — | — | — |
| Calcium Metasilicate | — | — | — | — | — | — | — | — | — | — |
| Calcium Stearate | — | — | — | — | — | — | — | — | 0.25 | 0.25 |
| Zinc Stearate | — | 0.25 | 0.25 | 0.5 | — | — | — | — | — | — |
| Silane (c) | — | — | — | — | 0.5 | 0.5 | 0.25 | — | — | — |
| Siloxane (d) | — | — | — | — | — | — | — | 0.25 | — | — |
| Antioxidant (e) | 0.5 | 0.5 | 0.5 | 0.5 | 0.5 | 0.5 | 0.5 | 0.5 | 0.5 | 0.5 |
| Carbon Black | — | — | 2.5 | — | 2.5 | — | 2.5 | 2.5 | 2.5 | 2.5 |
| Peroxide (f) | 1.8 | 1.8 | 1.8 | 1.8 | 1.8 | 1.8 | 1.8 | 1.8 | 1.8 | 1.8 |
| | 100 | 100 | 100 | 100 | 100 | 100 | 100 | 100 | 100 | 100 |

| | 11 | 12 | 13 | 14 | 15 | 16 | 17 |
|---|---|---|---|---|---|---|---|
| Ethylene-Vinyl Acetate Copolymer (a) | 70.9 | 70.9 | 70.9 | 70.9 | 70.9 | 70.9 | — |
| Ethylene-Ethyl Acrylate Copolymer (b) | — | — | — | — | — | — | 71.2 |
| Talc | — | — | — | — | — | — | 23.5 |
| Aluminum Silicate | — | — | — | — | — | — | — |
| Calcium Carbonate | — | — | — | — | — | — | — |
| Amorphous Silica | 24.05[1] | 24.05[1] | — | — | — | — | — |
| Aluminum Trihydrate | — | — | 24.05[1] | 24.05[1] | — | — | — |
| Calcuim Metasilicate | — | — | — | — | 26.8 | 24.05 | — |
| Calcium Stearate | — | — | — | — | — | — | — |
| Zinc Stearate | — | — | — | — | — | — | 0.5 |
| Silane (c) | 0.25 | 0.25 | 0.25 | 0.25 | — | 0.25 | — |
| Siloxane (d) | — | — | — | — | — | — | — |
| Antioxidant (e) | 0.5 | 0.5 | 0.5 | 0.5 | 0.5 | 0.5 | 0.5 |
| Carbon Black | 2.5 | 2.5 | 2.5 | 2.5 | — | 2.5 | 2.5 |
| Peroxide (f) | 1.8 | 1.8 | 1.8 | 1.8 | 1.8 | 1.8 | 1.8 |
| | 100 | 100 | 100 | 100 | 100 | 100 | 100 |

(a) 9–11.5% vinyl acetate; Melt Index 3.0;
(b) 18% ethyl acrylate; Melt Index 4.5;
(c) vinyl-tris (beta-methoxyethoxy)silane;
(d) octamethylcyclotetrasiloxane;
(e) 1,2-dihydro-2,3,4 trimethylquinoline;
(f) di-α-cumyl peroxide
[1]indicates that the filler was precoated.

The compositions in Table I were processed into test specimens as required by the following test procedures and subjected to the following test procedures:

Tensile strength and elongation
   ASTM-D412-68
Insulation resistance
   Underwriters Laboratory Subject 44 (November 24, 1969)
Oxygen Index
   ASTM-D2863-70
Scorch Time adapted so that a torque measurement can be continuously measured on the material.

When the material reaches 135° C., torque measurement begins as measured by a Brabender Plastograph Recorder. Torque continues to decrease until a significant degree of cross-linking is occurring at which time torque measurement begins increasing. At the time that the torque curve intersects the zero point, scorch is considered to have occurred. The width of a bowl shaped curve described by the Plastograph Recorder is the scorch time measurement. The wider the bowl of this curve, the less is the scorching.

The results of these tests are set forth in Table II.

TABLE II

| | | | Insulation Resistance (75° C./H$_2$O) Megohms/1000' | | | | | |
|---|---|---|---|---|---|---|---|---|
| Example | Tensile Strength(psi) | Elongation(%) | 1 week | 12 weeks | 24 weeks | 36 weeks | Oxygen Index | Scorch Time (mins) |
| 1 | 1170 | 250 | — | — | — | — | — | — |
| 2 | 2960 | 525 | — | — | — | — | — | — |
| 3 | 2890 | 520 | 650 | 1118 | 312 | 41.6 | 21.25 | 5.50 |
| 4 | 2290 | 415 | — | — | — | — | — | — |

TABLE II-continued

| Example | Tensile Strength(psi) | Elongation(%) | Insulation Resistance (75° C./H₂O) Megohms/1000' | | | | Oxygen Index | Scorch Time (mins) |
| --- | --- | --- | --- | --- | --- | --- | --- | --- |
| | | | 1 week | 12 weeks | 24 weeks | 36 weeks | | |
| 5 | 2160 | 360 | 832 | 286 | .104 | Failed after 25 weeks | 21.25 | 5.05 |
| 6 | 1700 | 280 | — | — | — | — | — | — |
| 7 | 1930 | 295 | 6240 | 9000 | 31.2 | 2.4 | 20.25 | 4.50 |
| 8 | 1750 | 240 | 6500 | 4.16 | 0.1 | — | 20.75 | 4.55 |
| 9 | 2220 | 505 | 3640 | 1.0 | 0.1 | — | 20.65 | 4.50 |
| 10 | 2520 | 495 | 3640 | 1.4 | 0.1 | — | 20.75 | 4.10 |
| 11 | 2220 | 385 | 11440 | 1.66 | 0.1 | — | 20.75 | 4.10 |
| 12 | 1990 | 420 | | | | | | |
| 13 | 2410 | 505 | 3380 | 4940 | 2.86 | 0.18 | 21.25 | 4.05 |
| 14 | 2110 | 330 | 3640 | 4160 | 598 | 17.6 | 21.25 | 4.90 |
| 15 | 1560 | 395 | 1924 | 23.4 | 0.1 | — | 20.0 | 4.65 |
| 16 | 1970 | 400 | 7280 | 1.09 | 0.10 | — | 20.75 | 4.70 |
| 17 | 2540 | 570 | — | — | — | — | 22.5 | — |

These results indicate that the use of a talc filler coated with a metallic salt of the present invention (Examples 2 and 3) provides a superior combination of tensile strength, elongation, insulation resistance, flame and processing characteristics (scorch time) that are not attainable with other mineral fillers and the treated mineral fillers, particularly the silane treated fillers of the prior art.

EXAMPLES 18-20

The compositions of these Examples were prepared by the methods as in the previous Examples. The formulations of these compositions are set forth in Table III.

TABLE III

| | 18 | 19 | 20 |
| --- | --- | --- | --- |
| Ethyl-Vinyl Acetate Copolymer (a) | 59.2 | 59.2 | 54.0 |
| Talc | 12.4[1] | — | — |
| Clay | — | 12.4[1] | — |
| Silica | — | — | 17.2[1] |
| Zinc Stearate | 0.5 | — | — |
| Siloxane (b) | — | 0.5 | — |
| Silane (c) | — | — | 0.4 |
| Flame retardant (d) | 17.3 | 17.3 | 17.2 |
| Antimony trioxide | 8.0 | 8.0 | 8.5 |
| Antioxidant (e) | 0.5 | 0.5 | 0.5 |
| Peroxide (f) | 2.1 | 2.1 | 2.2 |
| | 100 | 100 | 100 |

(a) 9-11.5% vinyl acetate; Melt Index 3.0;
(b) octamethylcyclotetrasiloxane;
(c) vinyl-tri-(beta-methoxyethoxy)silane;
(d) high melting hydrocarbon material containing 65% chlorine manufactured by Hooker Chemical Co.;
(e) 1,2-dihydro-2,2,4-trimethylquinoline;
(f) di-α-cumyl peroxide
[1]indicates the filler was precoated.

The compositions in Table III were processed into test specimen as required by the following test procedures and subjected to the following test procedures: Tensile strength and elongation, ASTM-412-68; Modulus; ASTM-D882-758; Oxygen Index, ASTM D-2863-70.

The results of these tests are set forth in Table IV.

TABLE IV

| Example | Tensile Strength (psi) | Elongation (%) | Modulus (psi) | Oxygen Index |
| --- | --- | --- | --- | --- |
| 18 | 2180 | 440 | 15,000 | 28.5 |
| 19 | 1570 | 310 | 12,200 | 26.8 |
| 20 | 1690 | 395 | 14,200 | 27.5 |

These results indicate that the use of a talc filler coated with a metal salt of the present invention (Example 18) provides a superior combination of tensile strength, elongation, modulus and oxygen index that is not attainable with other coated mineral fillers.

EXAMPLE 21

The composition of this Example was prepared by the methods as in the previous Examples. The formulation of this composition is as follows:

| Ethylene-Ethyl Acrylate Copolymer (a) | 74.8 |
| --- | --- |
| Talc | 15.0[1] |
| Carbon black (b) | 10.0 |
| Antioxidant (c) | 0.2 |
| | 100 |

(a) 13-16% ethyl acrylate; Melt Index 1.0-2.0
(b) Electrically conductive; surface area 1000 m²/g
[1]indicates that the filler was precoated with zinc stearate The composition was extruded onto the tape using a conventional type extruding machine and subjected to the following test procedures:

Tensile strength and elongation; and tensile strength and elongation after aging in an oven for 7 days at 100° C., ASTM-412-68; Brittleness temperature, F₅₀, ASTM D-746; Volume resistivity at 23° and 90° C., ASTM D-746.

The results of these tests are as follows:

| Tensile strength (psi) | |
| --- | --- |
| as molded | 1730 |
| after heat aging | 1690 |
| Elongation (%) | |
| as molded | 510 |
| after heat aging | 400 |
| Brittleness temperature, F₅₀ | −40° C. |
| Volume resistivity (ohm-cm) | |
| 23° C. | 630 |
| 90° C. | 5700 |

Obviously, other modifications and variations of the present invention are possible in light of the above teachings. It is, therefore, to be understood that changes may be made in the particular embodiments of this invention described which are within the full intended scope of the invention as defined by the appended claims.

What is claimed is:

1. A composition useful for coating wires or cables, having good electrical resistance, tensile strength and elongation consisting essentially of:
   (a) ethylene polymer, and
   (b) at least 10 parts by weight per 100 parts by weight of ethylene polymer of talc filler coated with at least one metallic salt of a fatty acid having 8 to 20 carbon atoms, wherein said metallic salt contains a metal selected from the metals of Groups Ia, IIa, and IIb of the Mendeleev Periodic Table of Elements.

2. The composition of claim 1 wherein said ethylene polymer is ethylene copolymer.

3. The composition of claim 2 wherein said ethylene polymer is ethylene-vinyl acetate copolymer.

4. The composition of claim 2 wherein said ethylene polymer is ethylene-alkyl acrylate copolymer.

5. The composition of claim 4 wherein said ethylene-alkyl acrylate copolymer is ethylene ethyl acrylate copolymer.

6. The composition of claim 3 wherein said talc filler is coated by mixing the talc, metallic salt of fatty acid, and ethylene polymer together in a mixer.

7. The composition of claim 4 wherein said talc filler is coated by mixing the talc, metallic salt of fatty acid, and ethylene polymer together in a mixer.

8. The composition of claim 3 wherein said talc filler is precoated prior to mixing said talc with ethylene polymer.

9. The composition of claim 4 wherein said talc filler is precoated prior to mixing said talc with ethylene polymer.

10. The composition of claim 1 wherein the ethylene polymer is curable.

11. The composition useful for coating wires or cables, suitable for use as a semi-conductor having good tensile strength and elongation consisting essentially of:
    (a) ethylene polymer,
    (b) at least 10 parts by weight per 100 parts by weight of ethylene polymer of talc filler coated with at least one metallic salt of a fatty acid having 8 to 20 carbon atoms, wherein said metallic salt contains a metal selected from the metals of Groups Ia, IIa, and IIb of the Mendeleev Periodic Table of Elements, and
    (c) conductive carbon black having a high specific surface area.

12. The composition of claim 11 wherein said ethylene polymer is ethylene copolymer.

13. The composition of claim 12 wherein said ethylene polymer is ethylene-vinyl acetate copolymer.

14. The composition of claim 12 wherein said ethylene polymer is ethylene-alkyl acrylate copolymer.

15. The composition of claim 14 wherein the ethylene-alkyl acrylate copolymer is ethylene-ethyl acrylate copolymer.

16. The compositions of claims 2, 3, 4, 5, 7, 8 or 11 wherein the metallic salt contains a metal selected from the metals of Groups IIa, and IIb of the Mendeleev Periodic Table of Elements.

17. The composition of claim 16 wherein the metallic salt is a stearate.

18. The composition of claim 17 wherein the metallic salt is calcium stearate.

19. The composition of claim 17 wherein the metallic salt is zinc stearate.

20. The composition of claims 2, 3, 4, 5, 8 or 11 wherein the metallic salt is present in an amount of from 0.05 to about 5.0 parts by weight per 100 parts by weight of talc.

21. The composition of claim 20 wherein the metallic salt is present in an amount of from 0.5 to about 2.0 parts by weight per 100 parts by weight of talc.

22. The composition of claims 2, 3, 4, 5, 8 or 11 wherein the talc is present in an amount of from 10 to 150 parts by weight per 100 parts by weight of ethylene polymer.

23. The composition of claim 22 wherein the talc is present in an amount of from 10 to about 25 Parts by weight per 100 parts by weight of ethylene polymer.

24. The composition of claim 22 wherein the talc is present in an amount of from about 25 to 45 parts by weight per 100 parts by weight ethylene polymer.

25. A masterbatch suitable for use with compatible ethylene polymers to form compositions useful for coating wires or cables having good electrical resistance, tensile strength and elongation, said masterbatch consisting essentially of:
    (a) ethylene polymer,
    (b) from 100 to 1000 parts by weight per 100 parts by weight of ethylene polymer of talc filler coated with at least one metallic salt of a fatty acid having 8 to 20 carbon atoms, wherein said metallic salt contains a metal selected from the metals of Groups Ia, IIa and IIb of the Mendeleev Periodic Table of Elements.

26. The masterbatch of claim 25 containing from 250 to 500 parts by weight of talc filler per 100 parts by weight of ethylene polymer.

27. The composition of claims 1, 11 or 25 wherein the ethylene polymer is ethylene homopolymer.

28. The composition of claim 27 wherein the ethylene homopolymer has a density of $\geq 0.94$.

29. The composition of claim 27 wherein the ethylene homopolymer has a density of $\leq 0.94$.

30. An electric wire or cable insulated with a curable composition having good electrical resistance, tensile strength and elongation, said composition consisting essentially of ethylene polymer and at least 10 parts by weight per 100 parts by weight of ethylene polymer of talc filler coated with at least one metallic salt of a fatty acid having 8 to 20 carbon atoms, wherein said metallic salt contains a metal selected from Groups Ia, IIa and IIb of the Medeleev Periodic Table of Elements.

31. An electric wire or cable having a conductive shield having good tensile strength and elongation said conductive shield consisting essentially of ethylene polymer, conductive carbon black having a high specific surface area and at least 10 parts by weight per 100 parts by weight of ethylene polymer of talc filler coated with at least one metallic salt of a fatty acid having 8 to 20 carbon atoms, wherein said metallic salt contains a metal selected from Groups Ia, IIa and IIb of the Medeleev Periodic Table of Elements.

32. A composition, useful for coating wires or cables having good electrical resistance, tensile strength and elongation consisting essentially of:
    (a) ethylene polymer,
    (b) at least 10 parts by weight per 100 parts by weight of ethylene polymer of talc filler coated with at least one metallic salt of a fatty acid having 8 to 20 carbon atoms, wherein said metallic salt contains a metal selected from the metals of Groups Ia, IIa and IIb of the Mendeleev Periodic Table of Elements, and
    (c) non-conductive carbon black.

33. The composition of claim 32 wherein the non-conductive carbon black is present in an amount of from 1 to about 25 parts by weight per 100 parts by weight of ethylene polymer.

34. A process for insulating an electrical conductor comprising extruding the composition of claim 1 onto an electrical conductor.

35. A process for insulating an electrical conductor comprising extruding the composition of claim 2 onto an electrical conductor.

36. A process for insulating an electrical conductor comprising extruding the composition of claim 3 onto an electrical conductor.

37. A process for insulating an electrical conductor comprising extruding the composition of claim 4 onto an electrical conductor.

38. A process for insulating an electrical conductor comprising extruding the composition of claim 5 onto an electrical conductor.

39. A process for insulating an electrical conductor comprising extruding the composition of claim 6 onto an electrical conductor.

40. A process for insulating an electrical conductor comprising extruding the composition of claim 7 onto an electrical conductor.

41. A process for insulating an electrical conductor comprising extruding the composition of claim 8 onto an electrical conductor.

42. A process for insulating an electrical conductor comprising extruding the composition of claim 9 onto an electrical conductor.

43. A process for insulating an electrical conductor comprising extruding the composition of claim 10 onto an electrical conductor.

44. A process for shielding an electrical conductor comprising extruding the composition of claim 11 onto an electrical conductor to be shielded.

45. A process for shielding an electrical conductor comprising extruding the composition of claim 12 onto an electrical conductor to be shielded.

46. A process for shielding an electrical conductor comprising extruding the composition of claim 13 onto an electrical conductor to be shielded.

47. A process for shielding an electrical conductor comprising extruding the composition of claim 14 onto an electrical conductor to be shielded.

48. A process for shielding an electrical conductor comprising extruding the composition of claim 15 onto an electrical conductor to be shielded.

* * * * *